(12) United States Patent
Kim et al.

(10) Patent No.: US 6,888,598 B2
(45) Date of Patent: May 3, 2005

(54) OPTICAL FILM AND LIQUID CRYSTAL DISPLAY DEVICE HAVING OPTICAL FILM

(75) Inventors: Wook-Sung Kim, Gyeonggi-do (KR);
Hyeon-Ho Son, Gyeonggi-do (KR);
Ku-Hyun Park, Gyeonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 94 days.

(21) Appl. No.: 10/028,981

(22) Filed: Dec. 28, 2001

(65) Prior Publication Data

US 2002/0089629 A1 Jul. 11, 2002

(30) Foreign Application Priority Data

Dec. 30, 2000 (KR) .......................................... 2000-87145

(51) Int. Cl.[7] .......................................... G02F 1/1325
(52) U.S. Cl. ...................... 349/117; 349/118; 349/129; 349/143; 349/178; 349/99; 349/130; 349/137
(58) Field of Search ................................. 349/115, 116, 349/117, 118, 119, 120, 122, 126

(56) References Cited

U.S. PATENT DOCUMENTS

| | | | | |
|---|---|---|---|---|
| 5,504,603 A | * | 4/1996 | Winker et al. | 349/117 |
| 5,589,963 A | * | 12/1996 | Gunning | 349/119 |
| 5,612,801 A | * | 3/1997 | Winker | 349/119 |
| 5,956,110 A | * | 9/1999 | Fujita et al. | 349/118 |
| 6,181,400 B1 | * | 1/2001 | Yang et al. | 349/117 |
| 6,266,114 B1 | * | 7/2001 | Skarohlid | 349/119 |
| 2002/0021400 A1 | * | 2/2002 | Lyu et al. | 349/178 |
| 2002/0030780 A1 | * | 3/2002 | Nishida et al. | 349/141 |

* cited by examiner

Primary Examiner—Nathan J. Flynn
Assistant Examiner—Fazli Erdem
(74) Attorney, Agent, or Firm—McKenna Long & Aldridge LLP

(57) ABSTRACT

A liquid crystal display device includes an upper substrate and a lower substrate facing and spaced apart from each other; an upper orientation film on an inner surface of the upper substrate; a lower orientation film on an inner surface of the lower substrate; a liquid crystal layer interposed between the upper and lower orientation films; an upper polarizing plate on an outer surface of the upper substrate; a lower polarizing plate on an outer surface of the lower substrate; and at least one compensation film disposed between the upper substrate and the upper polarizing plate or between the lower substrate and the lower polarizing plate. In the typical IPS-LCD device with a wide viewing angle, since the metallic black matrix of the upper substrate affects the voltage between the common and pixel electrodes, the black matrix is made of resin and cannot be formed with a bent portion because of the limits of the processing technology. Therefore, the typical IPS-LCD device has a limit for effective realization and a low aperture ratio.

22 Claims, 8 Drawing Sheets

OPTICAL FILM AND LIQUID CRYSTAL DISPLAY DEVICE HAVING OPTICAL FILM

This application claims the benefit of Korean Patent Application No. 2000-87145, filed on Dec. 30, 2000, which is hereby incorporated by reference as if fully set forth herein.

BACKGROUND OF THE INVENTION

1. Field of the Invention

The present invention relates to a liquid crystal display device, and more particularly to an optical film having a property of a wide viewing angle by compensating a phase difference and a liquid crystal display device having the optical film.

2. Discussion of the Related Art

Recently, to meet the needs of the times, a flat panel display device having small size, lightweight, and low power consumption is a subject of research. Accordingly, a thin film transistor-liquid crystal display (TFT-LCD) device that has high color quality and small size is developed. A conventional liquid crystal display (LCD) device uses optical anisotropy and polarization properties of liquid crystal (LC) molecules. The LC molecules have a definite orientational order in alignment resulting from their thin and long shapes. The alignment direction of the LC molecules can be controlled by applying an electric field to the LC molecules. In other words, as the alignment direction of the electric field is changed, the alignment of the LC molecules also changes. Since the incident light is refracted to the orientation of the LC molecules due to the optical anisotropy of the aligned LC molecules, images are displayed.

In the LCD device of the above-mentioned structure, research is being performed to improve the viewing angle and the contrast ratio. Especially, modes to perform wide viewing angle are represented by vertical alignment (VA) mode, in-plane switching (IPS) mode and electrically controlled birefringence (ECB) mode.

In the ECB mode, a liquid crystal layer uniformly oriented is interposed between orthogonal polarizers and transmittance is changed according to the birefringence effect by the applied voltage. A conventional LCD device of optically compensated birefringence (OCB) mode, which is one of ECB modes, has a symmetric bend structure such that an angle between the long axis of LC molecules and the substrate is nearly 90° (degrees) toward the midway point between the substrates, and then the angle is gradually decreased as approaching to the substrates. Therefore, the conventional LCD device of OCB mode has low response time.

FIG. 1 is a schematic perspective view of a liquid crystal display device of a conventional mono-domain optically compensated birefringence mode.

In the OCB cell 12, after rubbing in the same direction on the inner surfaces of the upper and lower substrates 10 and 11, a bend structure is formed by applying a voltage. Since the LC molecules rotate fast when a voltage is applied, a time for realignment, i.e., a response time is less than about 5 milliseconds. Therefore, the OCB cell has a good response property so that residual images cannot remain and the moving images can be well displayed. Even though the LCD device of a conventional mono-domain OCB mode has a good response property, the viewing angle is relatively narrow. To improve the viewing angle property, a biaxial film 15 is interposed between a first polarizing plate 13 and the upper substrate 10.

FIG. 2 is a schematic view of a compensation film and a liquid crystal cell of a conventional mono-domain optically compensated birefringence mode illustrating a compensation of a phase difference of the liquid crystal layer by a biaxial film.

In the bend structure of the OCB cell 20, the LC layer is aligned parallel to the substrates adjacent to the substrates and perpendicular to the substrate at the middle of the substrates. In the multi-domain structure, even though the alignment direction of each domain is different from each other, the alignment directions at the middle of the LC layer are same, i.e., vertical. Therefore, the compensation for the LC cell of this structure can be done along two directions by single compensation film, i.e., a conventional biaxial film 30. However, the conventional biaxial film cannot effectively compensate the birefringence of the LC cell of the bend structure so that the viewing angle of the LC cell is less than 100° (degree) and the LC cell has a limit in realization of a wide viewing angle. To improve this problem, the compensation film of a discotic liquid crystal having a disc-like molecular structure is suggested.

FIG. 3 is a schematic view of a compensation film of discotic liquid crystal and a liquid crystal cell of a conventional mono-domain optically compensated birefringence mode.

In FIG. 3, first and second compensation films 32 and 34 of discotic LC are respectively disposed on the upper and lower sides of the LC cell so that the birefringence of the nearly horizontally aligned LC 35 and the vertically aligned LC 37, can be compensated.

FIG. 4 is a schematic view of a compensation film of discotic liquid crystal.

In FIG. 4, the compensation film of a discotic LC is formed by splayed alignment of discotic LC 40 on the tri acetyl cellulose (TAC) 38.

FIG. 5 is a schematic view illustrating a compensation principle of a compensation film of discotic liquid crystal.

In FIG. 5, when the light passes the LC cell 36, where some of light passes normally and other light passes obliquely, since the phase of transmitted light differs according to the incident angle, the optical property of the transmitted light differs according to the viewing angle. The phase difference of the light transmitted through the LC cell can be expressed as a retardation dΔn (d.delta.n) that is defined by multiplying the thickness of the medium that the light passes through by the difference of refractive indices in the plane normal to the direction of light propagation $n_e - n_o$. To compensate the phase difference of the LC cell, a compensation film 40 of LC, whose retardation is same in absolute value but negative in sign with the LC cell, is used so that the viewing angle of the LC cell of OCB mode can be increased.

However, the compensation film of discotic LC has several drawbacks. The types of discotic LC are too few, and splayed alignment of the discotic LC is hard to form. Moreover, since it is difficult to increase the thickness of the discotic LC layer, the compensation film of discotic LC is not adequate for LCD devices of various modes. Especially, for the LCD device of OCB mode different from twisted nematic (TN) mode, since the change of the specification of the LC layer is frequently required, the compensation film of discotic LC is hard to be adopted. Furthermore, the use of the compensation film of discotic LC reduces the brightness of the LCD device by about 30% to 40%.

SUMMARY OF THE INVENTION

Accordingly, the present invention is directed to a liquid crystal display device that substantially obviates one or more of problems due to limitations and disadvantages of the related art.

An advantage of the present invention is to provide a liquid crystal display device that has a compensation film of nematic liquid crystal.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes an upper substrate and a lower substrate facing and spaced apart from each other; an upper orientation film on an inner surface of the upper substrate; a lower orientation film on an inner surface of the lower substrate; a liquid crystal layer interposed between the upper and lower orientation films; an upper polarizing plate on an outer surface of the upper substrate; a lower polarizing plate on an outer surface of the lower substrate; and at least one compensation film disposed between the upper substrate and the upper polarizing plate or between the lower substrate and the lower polarizing plate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings. Wherever possible, similar reference numbers will be used throughout the drawings to refer to the same or like parts.

Figure 1:
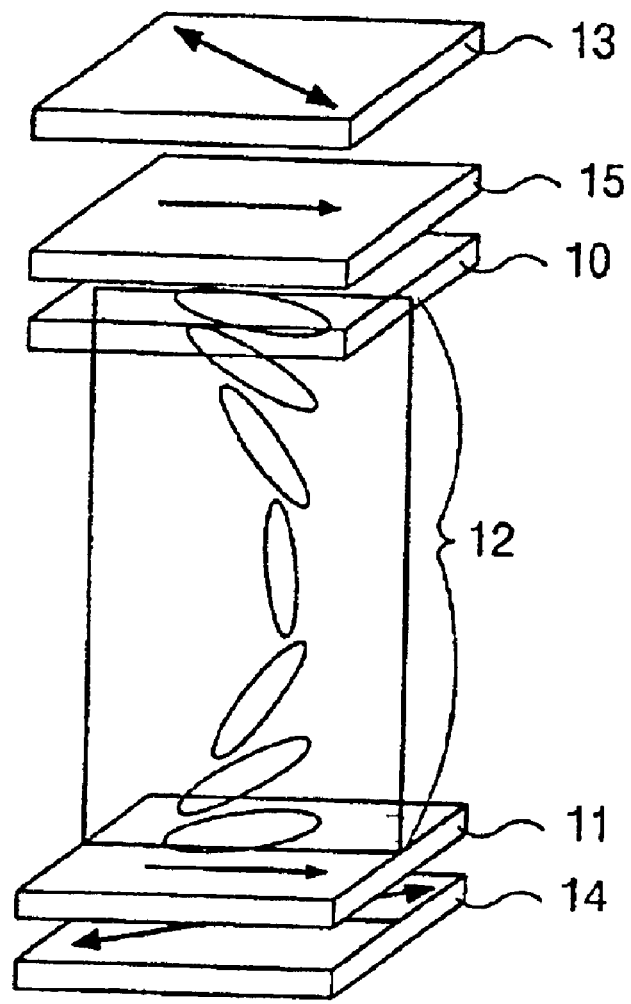
FIG. 1 is a schematic perspective view of a liquid crystal display device of a conventional mono-domain optically compensated birefringence mode.
Figure 2:
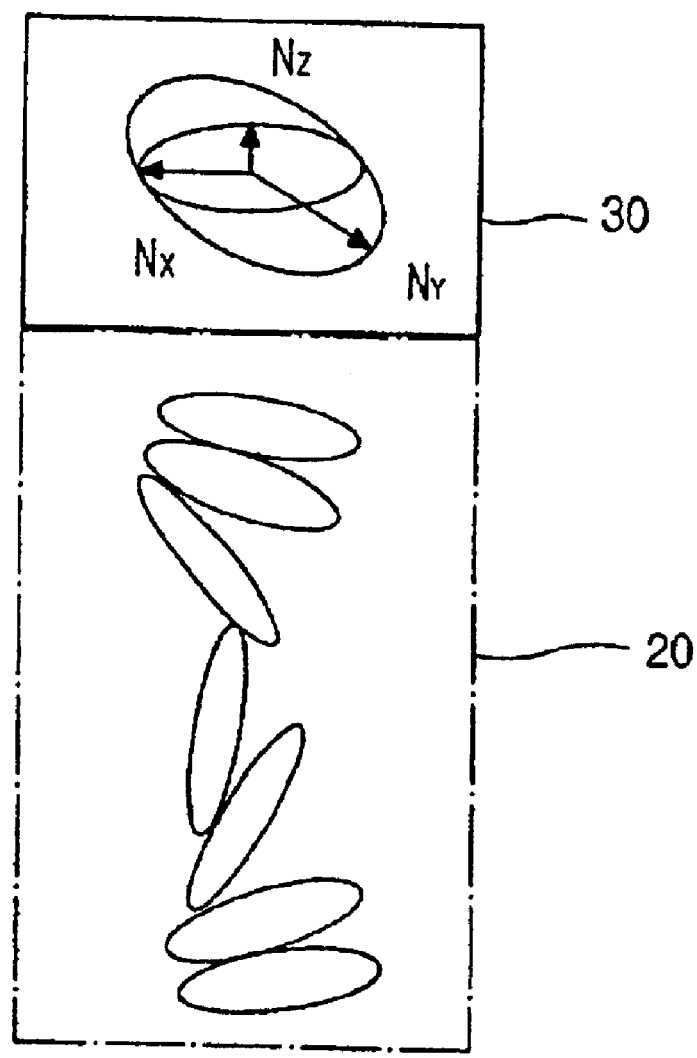
FIG. 2 is a schematic view of a biaxial film and a liquid crystal cell of a conventional mono-domain optically compensated birefringence mode.
Figure 3:
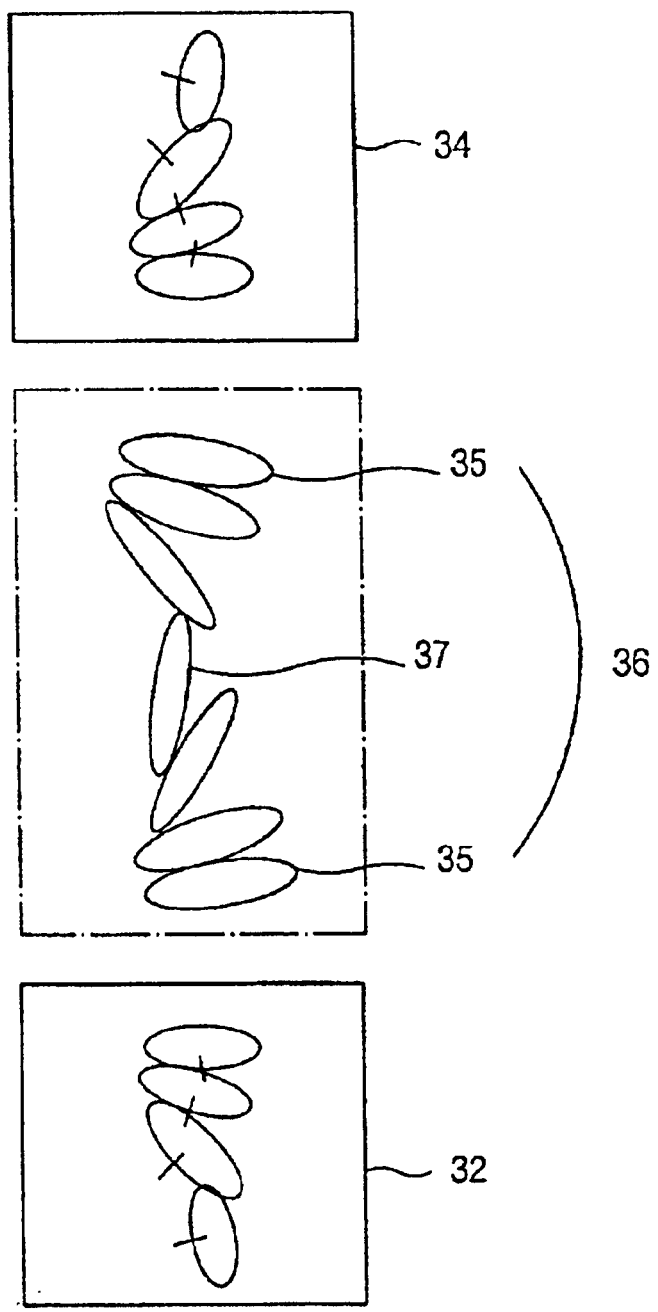
FIG. 3 is a schematic view of a compensation film of discotic liquid crystal and a liquid crystal cell of a conventional mono-domain optically compensated birefringence mode.
Figure 4:
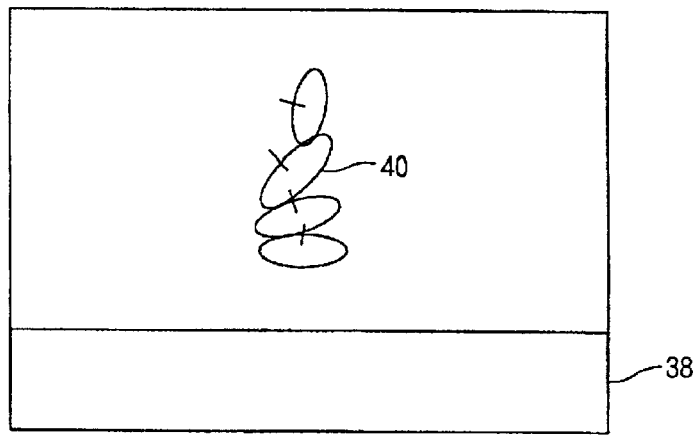
FIG. 4 is a schematic view of a compensation film of discotic liquid crystal.
Figure 5:
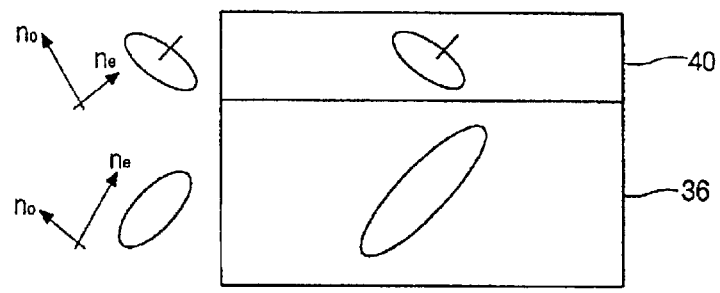
FIG. 5 is a schematic view illustrating a compensation principle of a compensation film of discotic liquid crystal.
Figure 6A:
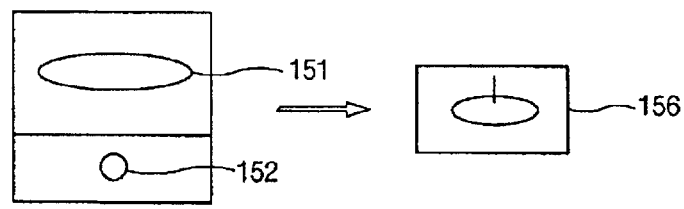
FIGS. 6A and 6B are schematic views illustrating a compensation principle of nematic liquid crystal optically equivalent to a C-plate and a tilted C-plate, respectively, according to a first embodiment of the present invention.
Figure 6B:
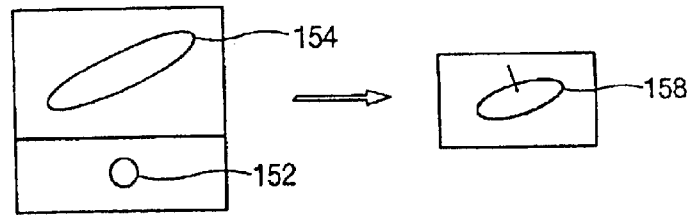

FIGS. 6A and 6B are schematic views illustrating compensation principle of nematic liquid crystal optically equivalent to a C-plate and a tilted C-plate, respectively, according to a first embodiment of the present invention.

In FIGS. 6A and 6B, the optical properties of the C-plate 156 and the tilted C-plate 158, which are composed of discotic liquid crystal (LC) and tilted discotic LC, respectively, can be acquired by combination of an A-plate 151 and 152 and an O-plate 154. The A-plate 151 and 152 is composed of an uniaxial medium having an optical axis parallel to the upper and lower substrates (not shown) and a refractive index of $n_x > n_y = n_z$. On the other hand, the O-plate 154 has a tilted optical axis.

In FIG. 6A, a first A-plate 151 is disposed on a second A-plate 152. The optical axis of the first A-plate 151 is orthogonal to the axis of the second A-plate 152. Then, the three-dimensional property of the refractive index of this structure is $n_x = n_y > n_z$, which is same as that of single C-plate.

In FIG. 6B, an O-plate 154 is disposed on an A-plate 152. The optical axis of the O-plate 154 is orthogonal to the axis of the A-plate 152. Then, the three dimensional property of the refractive index of this structure is similar to that of single tilted C-plate 158 that has the same slope as the O-plate 158 has.

Figure 7:
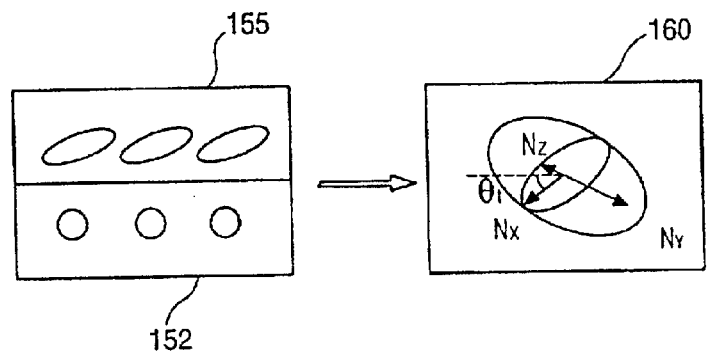
FIG. 7 is a schematic view illustrating a compensation principle of nematic liquid crystal optically equivalent to a tilted biaxial plate according to a second embodiment of the present invention.

FIG. 7 is a schematic view illustrating a compensation principle of nematic liquid crystal optically equivalent to a tilted biaxial plate according to a second embodiment of the present invention as that of single C-plate.

In FIG. 7, an O-plate 155 of a first material is disposed on an A-plate 152 of a second material. Since the three dimensional property of the refractive index of this structure is $n_x \neq n_y \neq n_z$ with a tilt angle $\theta_t$ (theta.sub.t), this combination can be used instead of a tilted biaxial film 160 having the same optical property.

Figure 8A:
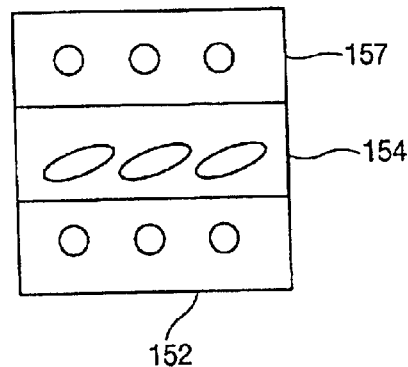
FIGS. 8A and 8B are schematic views illustrating a compensation principle of nematic liquid crystal according to third and fourth embodiments of the present invention, respectively.
Figure 8B:
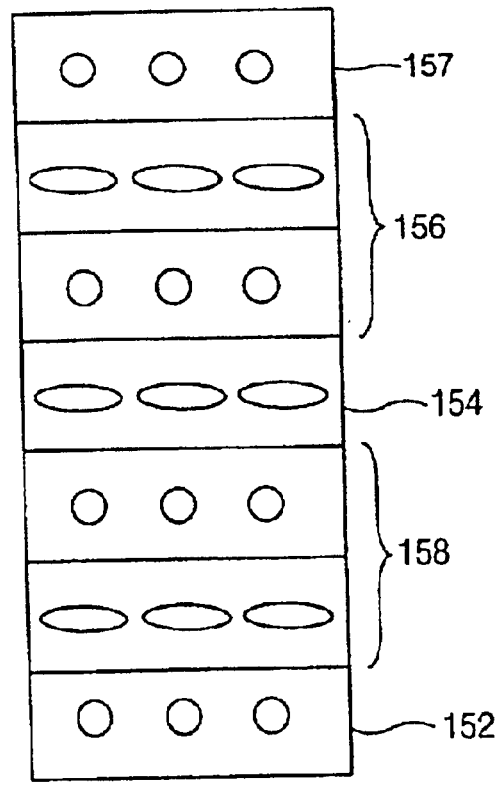

FIGS. 8A and 8B are schematic views illustrating a compensation principle of nematic liquid crystal according to third and fourth embodiments of the present invention.

In FIG. 8A, first and second A-plates 157 and 152 are disposed on both sides of an O-plate 154. This multi-layer structure has much better compensation effect than the first embodiment. Moreover, as shown in FIG. 8B, if C-plates 156 (of FIG. 6) are interposed between the first A-plate 157 and the O-plate 154, and between the O-plate 154 and the second A-plate 152, the compensation effect for vertically aligned LC, whose ratio is large in the LC cell of OCB mode, is much improved so that the aperture ratio can be more improved.

If the retardation of LC cell is within a range of about 400 nm to 1300 nm, the optimum relation for the retardations of compensation films and the LC cell can be expressed approximately as a following equation (1).

$$d\Delta n = (d\Delta n_A + d\Delta n_O)/2 + d\Delta n_C \quad (1)$$

where $d\Delta n$, $d\Delta n_A$, $d\Delta n_O$ and $d\Delta n_C$ are retardations of the LC cell, the A-plate, the O-plate and the C-plate, respectively. In this embodiment, the sum of retardations of all A-plates is within a range of about 40 nm to 350 nm, the retardation of the O-plate is within a range of about 40 nm to 350 nm, and the sum of retardations of all C-plates is within a range of about 100 nm to 700 nm.

Figure 9:
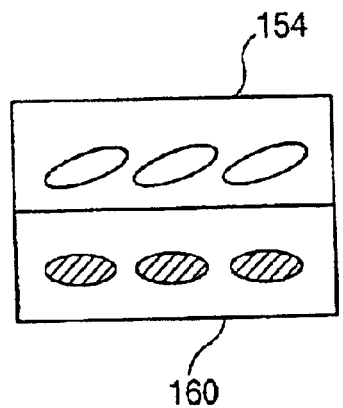
FIG. 9 is a schematic view illustrating a compensation principle of nematic liquid crystal according to a fifth embodiment of the present invention.

FIG. 9 is a schematic view illustrating a compensation principle of nematic liquid crystal according to a fifth embodiment of the present invention.

In FIG. 9, an optical axis of a biaxial film 160, which is defined by an axis of the largest three-dimensional refractive index, is substantially perpendicular to an optical axis of the O-plate 154.

In this structure, the relation of the retardations of the biaxial film 160, the O-plate 154 and the LC cell should approximately satisfy a following equation (2).

$$d\Delta n (d\Delta n_{xy} + d\Delta n_O)/2 + d\Delta n_{xz} \quad (1)$$

where $d\Delta n$ and $d\Delta n_O$ are retardations of the LC cell and the O-plate, respectively. The retardation difference of the biaxial film 160 can be calculated from $d\Delta n_{xy}=d(n_x-n_y)$ and $d\Delta n_{xz}=d(n_{xz}-n_{xz})$. In this embodiment, the sum of retardations of all A-plates is within a range of about 40 nm to 350 nm, the retardation of the O-plate is within a range of about 40 nm to 350 nm, and the sum of retardations of all C-plates is within a range of about 100 nm to 700 nm.

Figure 10:
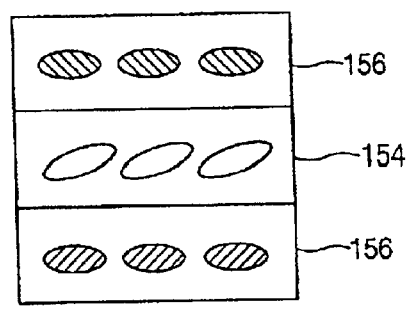
FIG. 10 is a schematic view illustrating a compensation principle of nematic liquid crystal according to a sixth embodiment of the present invention.

FIG. 10 is a schematic view illustrating a compensation principle of nematic liquid crystal according to a sixth embodiment of the present invention.

In FIG. 10, two biaxial films 156 are formed on both sides of an O-plate 154. In this structure, two optical axes of two biaxial films 156 are substantially perpendicular to an optical axis of the O-plate 154, respectively.

Figure 11:
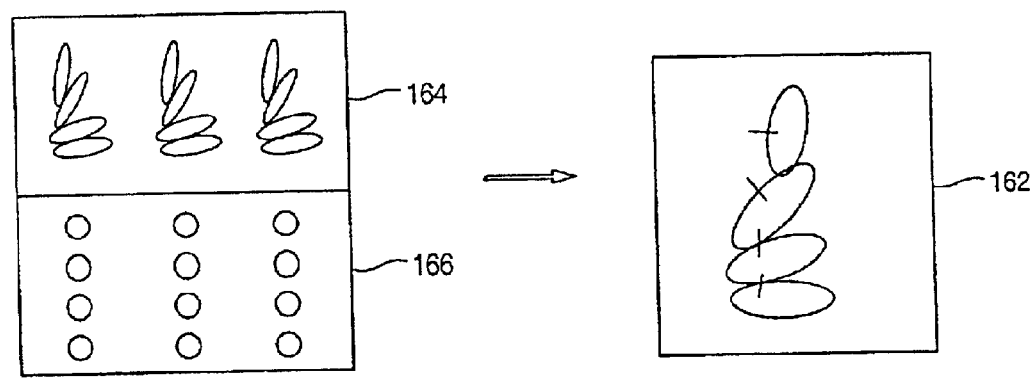
FIG. 11 is a schematic view of a compensation film of nematic liquid crystal for a liquid crystal display device of optically compensated birefringence mode according to a first embodiment of the present invention.

FIG. 11 is a schematic view of compensation film of nematic liquid crystal for a liquid crystal display device of optically compensated birefringence mode according to a first embodiment of the present invention.

In FIG. 11, to form a compensation film of nematic LC having the same effect of the splayed discotic LC layer 162, the nematic LC is aligned to have the same slope of the splayed discotic LC and the A-plate layer 166 is formed under the splayed nematic LC layer 164 such that the each optical axis of the A-plate layer 166 is substantially perpendicular to the corresponding optical axis of the splayed nematic LC layer 164. The compensation effect is increased by forming the compensation film of nematic LC having this structure on both sides of LC cell of OCB mode.

Figure 12:
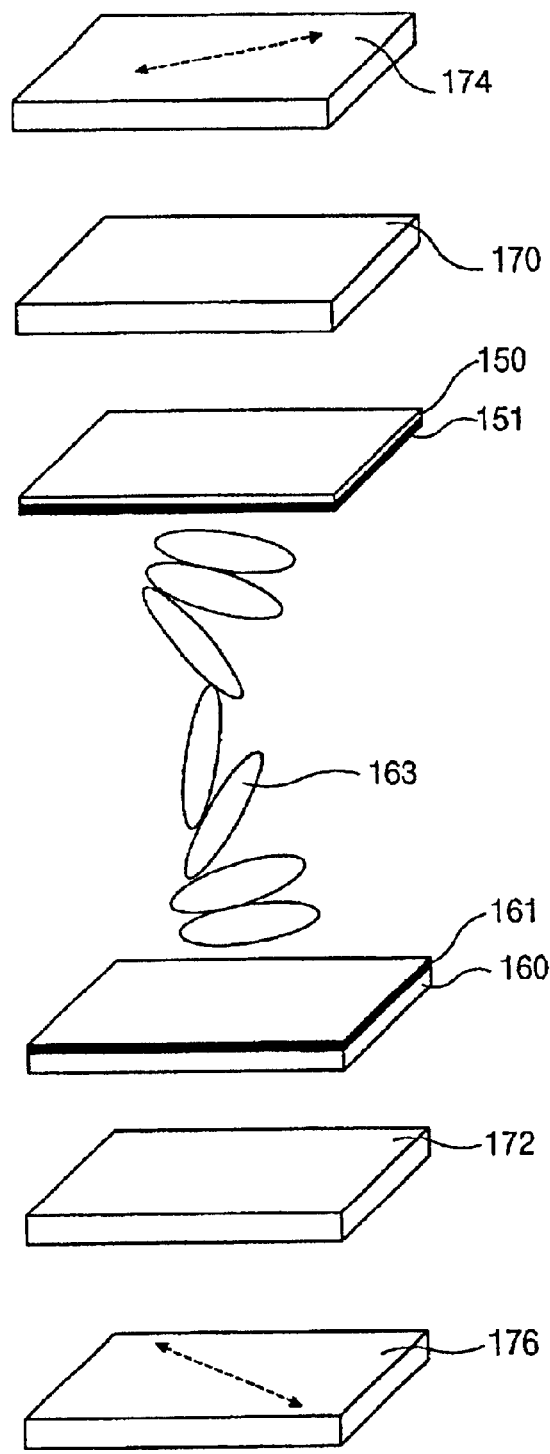
FIG. 12 is a schematic perspective view of a liquid crystal display device of optically compensated birefringence mode having a compensation film according to the present invention.

FIG. 12 is a schematic perspective view of a liquid crystal display device of optically compensated birefringence mode having a compensation film according to the present invention.

In FIG. 12, upper and lower substrates 150 and 160 are facing and spaced apart from each other. Upper and lower orientation films 151 and 161 are formed on inner surfaces of the upper and lower substrates 150 and 160, respectively. An LC layer 163 of a bend structure is interposed between the upper and lower orientation films 151 and 161. On outer surfaces of the upper and lower substrates 150 and 160, upper and lower compensation films 170 and 172 having one structure of the previous embodiments are formed, respectively. Upper and lower polarizing plates 174 and 176, whose transmission axes are substantially perpendicular to each other, are formed on outer surfaces of the upper and lower compensation films 170 and 172, respectively.

Consequently, an LCD device of OCB mode having a wide viewing angle. The advantages of the LCD device according to the present invention are low cost, easy application to various goods, diversity of the LC material and high aperture ratio.

It will be apparent to those skilled in the art that various modifications and variation can be made in the method of manufacturing a flat pane display device of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   an upper substrate and a lower substrate facing and spaced apart from each other;
   an upper orientation film on an inner surface of the upper substrate;
   a lower orientation film on an inner surface of the lower substrate;
   a liquid crystal layer interposed between the upper and lower orientation films;
   an upper polarizing plate on an outer surface of the upper substrate;
   a lower polarizing plate on an outer surface of the lower substrate; and
   at least one compensation film disposed between the upper substrate and the upper polarizing plate;
   wherein the compensation film is multi-layers of a first A-plate, an O-plate and a second A-plate, and
   wherein the liquid crystal layer initially has an alignment state parallel to the upper and lower substrates adjacent to the upper and lower substrates; perpendicular to the upper and lower substrates at a midpoint between the upper and lower substrates; and tilted to the upper and lower substrates between the upper substrate and the midpoint and between the lower substrate and the midpoint.

2. The liquid crystal display device according to claim 1, wherein the upper and lower orientation films are aligned parallel to each other.

3. The liquid crystal display device according to claim 1, wherein a sum of retardations of the first and second A-plates is within a range of about 40 to 350 nanometers.

4. The liquid crystal display device according to claim 1, wherein a retardation of the O-plate is within a range of about 40 to 350 nanometers.

5. The liquid crystal display device according to claim 1, further comprising a plurality of C-plates in the compensation film.

6. The liquid crystal display device according to claim 5, wherein a sum of retardations of the C-plates is within a range of about 100 to 700 nanometers.

7. The liquid crystal display device according to claim 1, wherein sum of retardations of the first and second A-plates with respect to x-y axis d(nx−ny) is within a range of about 50 to 300 nanometers, and wherein sum of retardations of the first and second A-plates with respect to x-z axis d(nx−nz) is within a range of about 100 to 700 nanometers.

8. The liquid crystal display device according to claim 1, further comprising a plurality of C-plates in the compensation film.

9. The liquid crystal display device according to claim 8, wherein a sum of retardations of the C-plates is within a range of about 100 to 700 nanometers.

10. The liquid crystal display device according to claim 1, wherein the compensation film is multi-layers of an A-plate and a splayed O-plate, optical axes of the splayed O-plate having a splayed structure.

11. A liquid crystal display device, comprising:
an upper substrate and a lower substrate facing and spaced apart from each other;
an upper orientation film on an inner surface of the upper substrate;
a lower orientation film on an inner surface of the lower substrate;
a liquid crystal layer interposed between the upper and lower orientation films;
an upper polarizing plate on an outer surface of the upper substrate;
a lower polarizing plate on an outer surface of the lower substrate; and
at least one compensation film disposed between the lower substrate and the lower polarizing plate;
wherein the compensation film is multi-layers of a first A-plate, an O-plate and a second A-plate, and
wherein the liquid crystal layer initially has an alignment state parallel to the upper and lower substrates adjacent to the upper and lower substrates; perpendicular to the upper and lower substrates at a midpoint between the upper and lower substrates; and tilted to the upper and lower substrates between the upper substrate and the midpoint and between the lower substrate and the midpoint.

12. The liquid crystal display device according to claim 11, wherein the upper and lower orientation films are aligned parallel to each other.

13. The liquid crystal display device according to claim 11, wherein a sum of retardations of the first and second A-plates is within a range of about 40 to 350 nanometers.

14. The liquid crystal display device according to claim 11, wherein a retardation of the O-plate is within a range of about 40 to 350 nanometers.

15. The liquid crystal display device according to claim 11, further comprising a plurality of C-plates in the compensation film.

16. The liquid crystal display device according to claim 15, wherein a sum of retardations of the C-plates is within a range of about 100 to 700 nanometers.

17. The liquid crystal display device according to claim 11, wherein sum of retardations of the first and second A-plates with respect to x-y axis d(nx−ny) is within a range of about 50 to 300 nanometers, and wherein sum of retardations of the first and second A-plates with respect to x-z axis d(nx−nz) is within a range of about 100 to 700 nanometers.

18. The liquid crystal display device according to claim 11, further comprising a plurality of C-plates in the compensation film.

19. The liquid crystal display device according to claim 18, wherein a sum of retardations of the C-plates is within a range of about 100 to 700 nanometers.

20. The liquid crystal display device according to claim 11, wherein the compensation film is multi-layers of an A-plate and a splayed O-plate, optical axes of the splayed O-plate having a splayed structure.

21. A liquid crystal display device, comprising:
an upper substrate and a lower substrate facing and spaced apart from each other;
an upper orientation film on an inner surface of the upper substrate;
a lower orientation film on an inner surface of the lower substrate;
a liquid crystal layer interposed between the upper and lower orientation films;
an upper polarizing plate on an outer surface of the upper substrate;
a lower polarizing plate on an outer surface of the lower substrate; and
at least one compensation film disposed between the upper substrate and the upper polarizing plate,
wherein the compensation film is multi-layers of a first biaxial film, an O-plate and a second biaxial film, three dimensional refractive index of the first and second biaxial films having a relation of nx≠ny≠nz.

22. A liquid crystal display device, comprising:
an upper substrate and a lower substrate facing and spaced apart from each other;
an upper orientation film on an inner surface of the upper substrate;
a lower orientation film on an inner surface of the lower substrate;
a liquid crystal layer interposed between the upper and lower orientation films;
an upper polarizing plate on an outer surface of the upper substrate;
a lower polarizing plate on an outer surface of the lower substrate; and
at least one compensation film disposed between the lower substrate and the lower polarizing plate,
wherein the compensation film is multi-layers of a first biaxial film, an O-plate and a second biaxial film, three dimensional refractive index of the first and second biaxial films having a relation of nx≠ny≠nz.

* * * * *